(12) United States Patent
Matsuda et al.

(10) Patent No.: US 7,430,225 B2
(45) Date of Patent: Sep. 30, 2008

(54) FIBER LASER BEAM PROCESSING APPARATUS

(75) Inventors: Yasushi Matsuda, Chiba-ken (JP); Hidenori Shimada, Chiba-ken (JP); Shinichi Nakayama, Chiba-ken (JP)

(73) Assignee: Miyachi Technos Corporation, Chiba-Ken (JP)

( * ) Notice: Subject to any disclaimer, the term of this patent is extended or adjusted under 35 U.S.C. 154(b) by 0 days.

(21) Appl. No.: 11/699,431

(22) Filed: Jan. 30, 2007

(65) Prior Publication Data

US 2007/0189339 A1 Aug. 16, 2007

(30) Foreign Application Priority Data

Jan. 31, 2006 (JP) ............................. 2006-022679

(51) Int. Cl.
*H01S 3/30* (2006.01)
(52) U.S. Cl. ............................. 372/6; 372/101; 372/108
(58) Field of Classification Search .................... 372/6, 372/101, 108
See application file for complete search history.

(56) References Cited

U.S. PATENT DOCUMENTS 7,155,099 B2 * 12/2006 Broderick et al. ............ 385/125
2006/0056470 A1 * 3/2006 Liu et al. .................... 372/38.1

* cited by examiner

*Primary Examiner*—Dung T Nguyen
(74) *Attorney, Agent, or Firm*—Wenderoth, Lind & Ponack, L.L.P.

(57) ABSTRACT

The fiber laser beam processing apparatus includes a fiber laser oscillator, a laser power source unit, a laser injecting unit, a fiber transmission system, a laser beam irradiating unit, a processing table, etc. The fiber laser oscillator includes an optical fiber for oscillation, an electric optical pumping unit that applies an excitation beam for optical pumping onto an end face of the optical fiber for oscillation, and a pair of optical resonator mirrors optically facing each other through the optical fiber for oscillation. The optical fiber for oscillation includes a core extending on the central axis thereof, a clad surrounding the core, an air layer surrounding the clad, and a support surrounding and supporting the air layer.

6 Claims, 5 Drawing Sheets

FIBER LASER BEAM PROCESSING APPARATUS

BACKGROUND OF THE INVENTION

1. Field of the Invention

The present invention relates to a fiber laser beam processing apparatus that executes laser beam processing using a fiber laser beam.

2. Description of the Related Art

Recently, a fiber laser beam processing apparatus has been practically used that executes desired laser beam processing by applying a laser beam generated by a fiber laser onto a work to be processed.

A conventional fiber laser beam processing apparatus uses as an optical fiber for oscillation a double-clad fiber (DCF) having a two-layer clad structure including an inner clad and an outer clad; causes an excitation beam to propagate in the axial direction confining the beam in the inner clad by the total reflection on the interface between the clads; causes the beam to cross a core many times during the propagation; thereby, causes an excitation element in the core to be pumped; and takes out an oscillated beam or a fiber laser beam having a predetermined wavelength from an end face of the core in the axial direction. The apparatus uses a laser diode (LD) as an excitation light source and is adapted to condense and inject an excitation laser beam of the LD onto the end face of the DCF through an optical lens.

In addition to the above DCF laser of an LD end-face excitation scheme, the conventional fiber laser beam processing apparatus also uses a fiber laser of a so-called "pigtail scheme" having a configuration according to which multiple optical guides (for example, optical fibers) are branched in the form of branches from the side of an oscillating optical fiber and an LD for excitation is integrally coupled to the tip of each of the guides.

As above, a laser beam of an LD that is small and light and has a high luminous efficiency is used as the excitation beam of the fiber laser. However, an LD beam has a poor beam quality concerning the beam mode and convergence thereof. Therefore, a DCF laser of the LD end-face excitation scheme in the conventional fiber laser beam processing apparatus has a low optical coupling efficiency between the excitation LD and the DCF and, as a result, obtaining a high output fiber laser beam is difficult using the DCF laser. According to the pigtail scheme, a laser beam from an LD for excitation is supplied to an optical fiber for oscillation through an optical fiber (a branched fiber). Therefore, the coupling efficiency or the excitation efficiency thereof is high and a high output fiber laser beam can be obtained relatively easily. On the contrary, an excitation unit (the optical guide and the LD for excitation) is complicated and bulky. In addition, because the unit is physically integrally coupled to the optical fiber for oscillation, a problem has arisen that maintenance and repairing of components therein (especially the LD for excitation) is difficult.

SUMMARY OF THE INVENTION

The present invention was conceived in view of the above problems of the above conventional technique and the object thereof is to provide a fiber laser beam processing apparatus that mounts thereon a fiber laser that has a simple and small configuration and also has excellent maintainability and, in addition, a high output fiber laser beam suitable for laser beam processing can be easily obtained therefrom.

In order to achieve the above object, according to a major aspect of the present invention there is provided a fiber laser beam processing apparatus comprising an optical fiber for oscillation including a core containing a luminous element; a clad surrounding the core, a gas layer surrounding the clad, and a support that surrounds and supports the gas layer; an excitation light source that generates an excitation beam to excite the core of the optical fiber for oscillation; an optical lens that condenses the excitation beam from the excitation light source and injects the excitation beam onto one end face or both end faces of the optical fiber for oscillation; and a laser beam irradiating unit that condenses and applies the laser beam generated by the optical fiber for oscillation onto a processing point on a work to be processed.

To optically pump the optical fiber for oscillation, the present invention employs an end-face excitation scheme with which simplification and downsizing of the excitation unit can be facilitated and the maintainability thereof is excellent. That is, the excitation beam from the excitation light source is condensed and injected onto the end face of the optical fiber for oscillation through the optical lens. In the optical fiber for oscillation, the excitation beam propagates in the clad in the axial direction repeating total reflection on the interface between the clad and the air layer. In the end-face excitation scheme, the maximum of the incident angle or the numerical aperture of the fiber for oscillation to receive the excitation beam is defined by the refractive index of the clad and the refractive index of the material surrounding the clad and, as the difference between the indexes becomes relatively larger, the numerical aperture becomes larger and the range of the incident angle at which the excitation beam can enter the end face of the clad becomes wider. The present invention employs a configuration of surrounding the clad with the air layer having the minimum refractive index and, thereby, a significant increase of the numerical aperture for the excitation beam can be facilitated and the excitation beam can be supplied to the optical fiber for oscillation in high efficiency coupling. Thereby, in the end-face excitation scheme, an increase of the output of the fiber laster beam can be easily and simply realized and desired laser beam welding processing can be executed excellently.

According to a preferred aspect of the present invention, a core is made of quartz glass doped with ions of a rare-earth element as a luminous element and a clad is made of quartz glass.

According to another preferred aspect, a gas layer is configured by hollow fibers that are made of a material having a refractive index that is equal or close to that of a clad and are arranged densely in the circumferential direction. When the clad is quartz glass, the material of the hollow fibers is preferably quartz.

According to another preferred aspect, an optical resonator is provided to oscillate and amplify an oscillation ray having a predetermined wavelength generated by the core. The optical resonator, as a preferred aspect, is configured by a reflecting mirror facing an end face of the optical fiber for oscillation through an optical lens. In this case, the optical lens collimates the oscillation ray emitted from the end face of the optical fiber for oscillation into a parallel beam and condenses the oscillation ray reflected and returned by a reflecting mirror onto the end face of the fiber for oscillation.

According to another preferred aspect, the excitation light source is configured by a laser diode. The number of laser diodes is arbitrary and an array structure or a stack structure can be taken therefore.

As another preferred aspect, a real-time power feedback controlling mechanism is configured by a setting unit that sets a desired reference value or a reference waveform for the laser output of the laser beam, a laser output measuring unit that measures the laser output of the laser beam oscillated and outputted by the optical fiber for oscillation, and a laser power source unit that drives the excitation light source such that a laser output measured value obtained by the laser output measuring unit coincides with the reference value or the reference waveform. Even when any of degradation of the excitation light source, shift of the wavelength, etc., has occurred, the laser output of the fiber laser beam is maintained at a set vale and an arbitrary waveform control is executed accurately according to settings by the operation of the power feedback controlling mechanism.

According to another preferred aspect, the fiber laser beam generated by the optical fiber for oscillation is transmitted to a laser beam irradiating unit through an optical fiber for transmission. In such a configuration, the beam mode and the laser output of the fiber laser beam are both stable and, therefore, the convergence onto the optical fiber for transmission is excellent and the injection numerical aperture (NA) and the irradiation NA are stable. Therefore, high-precision and high-efficiency fiber transmission is enabled and the quality of remote laser beam processing can be improved. In addition, the optical fiber for oscillation or the fiber laser oscillator can be placed away from a processing site and, therefore, the fiber laser oscillator can be protected against disturbances generated at the processing site such as vibrations, heat, ambient light, etc.

According to the fiber laser beam processing apparatus of the present invention, due to the above configuration and actions, a high-output fiber laser beam that is excellent in maintainability and suitable for laser beam processing can be easily obtained by a simple and small configuration.

BRIEF DESCRIPTION OF THE DRAWINGS

The above and other objects, aspects, features and advantages of the present invention will become more apparent from the following detailed description when taken in conjunction with the accompanying drawings, in which.

DESCRIPTION OF THE PREFERRED EMBODIMENTS

Description will be given for a preferred embodiment of the present invention referring to the accompanying drawings.

Figure 1:
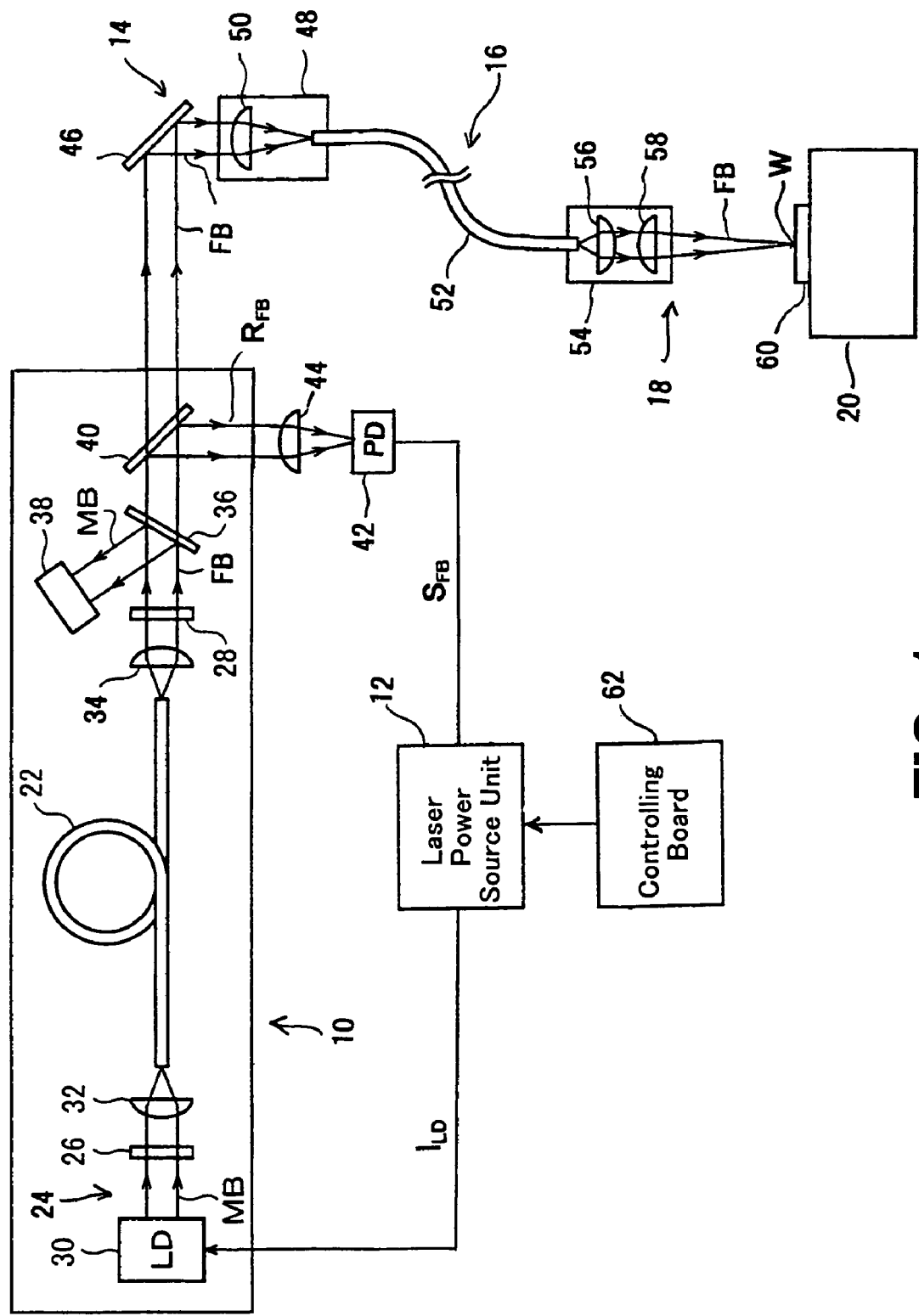
FIG. 1 depicts the configuration of a fiber laser beam processing apparatus in an embodiment of the present invention.

FIG. 1 depicts the configuration of a fiber laser beam processing apparatus in an embodiment of the present invention. The fiber laser beam processing apparatus is configured to include a fiber laser oscillator 10, a laser power source unit 12, a laser beam injecting unit 14, a fiber transmission system 16, a laser beam irradiating unit 18, a processing table 20, etc.

The fiber laser oscillator 10 includes an optical fiber for oscillation (hereinafter, "oscillating fiber") 22, an electric optical pumping unit 24 that applies an excitation beam MB for optical pumping onto an end face of the oscillating fiber 22, and a pair of optical resonator mirrors 26 and 28 optically facing each other through the oscillating fiber 22.

The electric optical pumping unit 24 includes a laser diode (LD) 30 and an optical lens 32 for condensing the beam. The LD 30 is turned on and driven by an excitation current $I_{LD}$ from the laser power source unit 12 and oscillates and outputs the laser beam MB for excitation. The number of LD elements constituting the LD 30 is arbitrary and an array structure or a stack structure can be taken therefore. The optical lens 32 condenses and injects the laser beam MB for excitation from the LD 30 onto an end face of the oscillating fiber 22. The optical resonator mirror 26 disposed between the LD 30 and the optical lens 32 is adapted to transmit the laser beam MB for excitation injected from the LD 30 and to totally reflect on the optical axis of the resonator the oscillation ray injected from the oscillating fiber 22.

As described below, the oscillating fiber 22 includes a core doped with a predetermined luminous element and a clad surrounding the core coaxially, and uses the core as the active medium thereof and the clad as the propagation optical path for the excitation beam. The excitation laser beam MB injected onto the end face of the oscillating fiber 22 as above propagates in the axial direction in the oscillating fiber 22 being confined by the total reflection on the clad outer circumferential interface, and optically excites the luminous element in the core by crossing many times the core during the propagation. In this manner, an oscillation ray having a predetermined wavelength is emitted in the axial direction from both end faces of the core. The oscillation ray goes and returns many times between the optical resonator mirrors 26 and 28 and, thereby, is resonated and amplified, and a fiber laser beam FB having the predetermined wavelength is taken out from the optical resonator mirror 28 of the pair that consists of a partially reflecting mirror.

The optical lenses 32 and 34 collimate the oscillation ray emitted from the end face of the oscillating fiber 22 into a parallel beam, direct the parallel beam to the optical resonator mirrors 26 and 28, and condense on the end face of the oscillating fiber 22 the oscillation ray reflected and returned by the optical resonator mirrors 26 and 28. The laser beam MB for excitation having passed through the oscillating fiber 22 is transmitted through the optical lens 34 and the optical resonator mirror 28 and, thereafter, is returned by a returning mirror 36 being directed to a laser absorber 38 on the side. The fiber laser beam FB outputted from the optical resonator mirror 28 is transmitted straight through the returning mirror 36, passes through a beam splitter 40, and enters the laser beam injecting unit 14.

The beam splitter 40 reflects a portion (for example, one percent) of the fiber laser beam FB injected to a predetermined direction, that is, toward a light-receiving element for monitoring the power thereof, for example, a photo diode (PD) 42. A condenser lens 44 that condenses the reflected beam from the beam splitter 40 or a monitor beam $R_{FB}$ may be disposed in front of the photo diode (PD) 42.

The photo diode (PD) 42 photo-electrically converts the monitor beam $R_{FB}$ from the beam splitter 40, outputs an electric signal (a laser output measured signal) $S_{FB}$ that indicates the laser output (the peak power) of the fiber laser beam FB, and provides this signal $S_{FB}$ to the laser power source unit 12. The laser power source unit 12 inputs the laser output measured signal $S_{FB}$ from the photo diode (PD) 42 as a feedback signal and controls the excitation current $I_{LD}$ for the LD 30 in real time such that the laser output of the fiber laser beam FB coincides with or follows the set value or the set waveform of the laser output desired by a user inputted from a controlling board 62. Because this real-time power feedback control works, the laser output of the fiber laser beam FB oscillated and outputted by the fiber laser oscillator 10 is maintained at the set value and an arbitrary waveform control is executed accurately as has been set even when any of degradation, waveform shifting, etc., of the LD 30 has occurred.

The fiber laser beam FB having entered the laser beam injecting unit 14 is deflected into a predetermined direction by a bent mirror 46, is condensed by a condenser lens 50 in an injecting unit 48, and is injected onto an end face of an optical fiber for transmission (hereinafter, "transmitting fiber") 52 of the fiber transmission system 16. The transmitting fiber 52 includes, for example, an SI (Step Index)-type fiber and transmits the fiber laser beam FB injected in the injecting unit 48 to an irradiating unit 54 of the laser beam irradiating unit 18.

The irradiating unit 54 includes a collimating lens 56 that collimates the fiber laser beam FB having exited from the end face of the transmitting fiber 52 into a parallel beam, and a condenser lens 58 that condenses the fiber laser beam FB that is the parallel beam onto a predetermined focus position, and condenses and applies the fiber laser beam FB onto a processing point W on a work 60 to be processed.

For example, in the case of laser beam welding, an excitation current having a pulse waveform is supplied from the laser power source unit 12 to the LD 30 and, thereby, the excitation laser beam MB having a pulse waveform is supplied from the LD 30 to the oscillating fiber 22 in the fiber laser oscillator 10 and, thereby, a fiber laser beam FB having a pulse waveform is oscillated and outputted from the fiber laser oscillator 10. The fiber laser beam FB having the pulse waveform passes through the laser beam injecting unit 14, the fiber transmission system 16, and the laser beam irradiating unit 18, and is condensed and applied onto the processing point W on the work 60 to be processed. At the processing point W, a material to be processed is melted by the energy of the fiber laser beam FB having the pulse waveform and, after the application of a pulse, solidifies and forms a nugget.

In the fiber laser beam processing apparatus, the fiber laser oscillator 10 employs the oscillating fiber 22 including an elongated core having a diameter of about 10 μm and a length of about several meters as the active medium and, therefore, can oscillate and output the fiber laser beam FB having a small beam diameter and a small beam divergence angle. In addition, the excitation laser beam MB injected into the end face of the oscillating fiber 22 consumes completely the excitation energy thereof by crossing many times the core while the beam MB propagates on a several-meter-long long optical path in the oscillating fiber 22 and, therefore, the oscillator 10 can generate the fiber laser beam FB at a very high oscillation efficiency. The beam mode of the fiber laser oscillator 10 is very stable because the core of the oscillating fiber 22 generates no thermal lens effect.

In addition, because the fiber laser beam processing apparatus employs the LD end-face excitation scheme as above, the excitation mechanism is simple and small and maintenance and repairing of the components therein (especially, those around the LD 30) can be executed easily. Furthermore, as described below, the optical coupling efficiency between the LD 30 and the oscillating fiber 22 is significantly improved and, therefore, the high-output fiber laser beam FB suitable for laser beam welding processing that needs high energy can be easily obtained.

Figure 2:
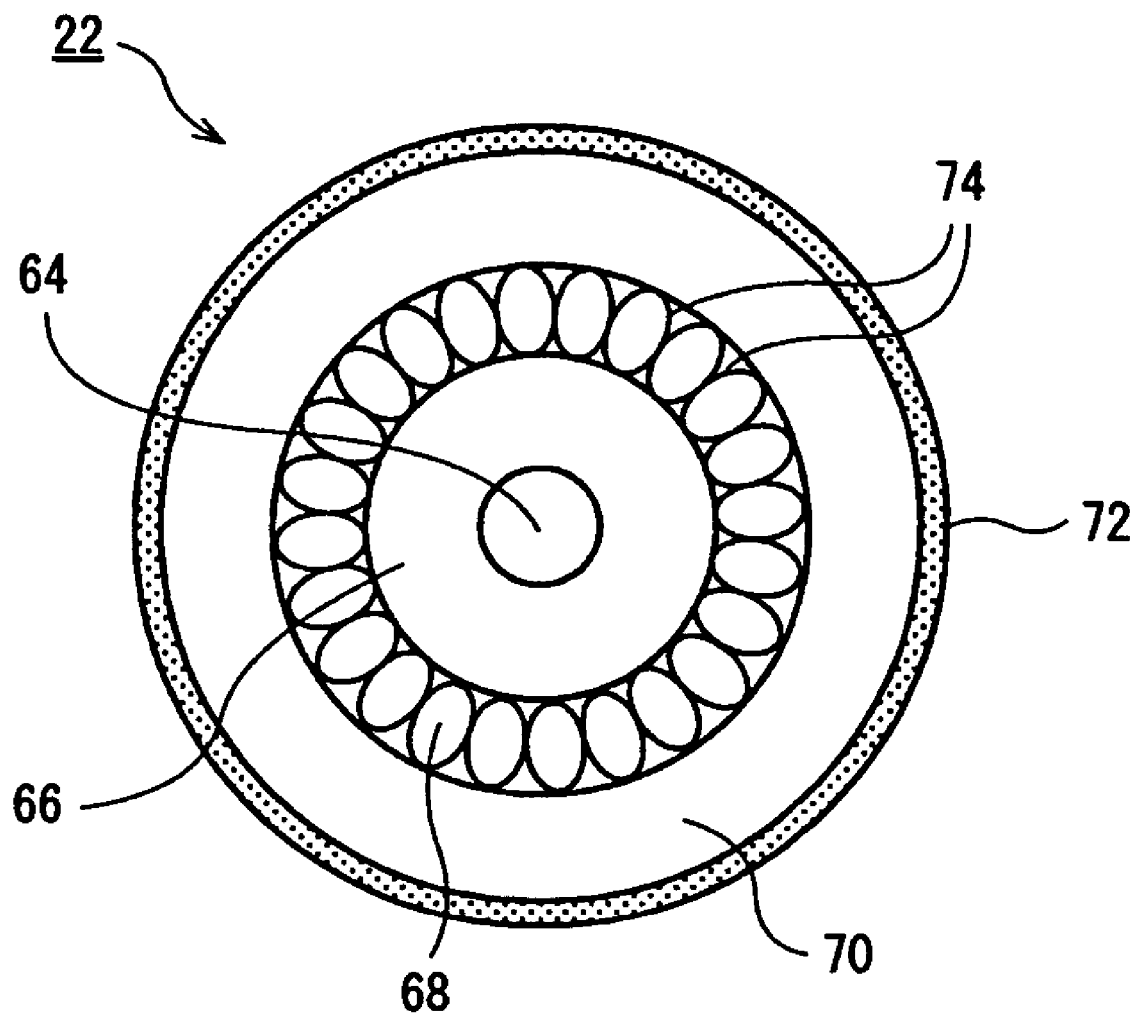
FIG. 2 depicts a simplified schematic cross-sectional view of the structure of an optical fiber for oscillation in the embodiment.

FIG. 2 depicts the structure of the oscillating fiber 22 in the embodiment. The oscillating fiber 22 includes a core 64 extending on the central axis thereof, a clad 66 surrounding the core 64, an air layer 68 surrounding the clad 66, a support 70 supporting the air layer 68 by surrounding the air layer 68, and a sheath 72 surrounding the supporting unit 70.

The core 64 is made of quartz glass doped with a rare-earth element ions, for example, $Nd^{3+}$. The clad 66 is made of, for example, quartz glass. The support 70 is made of, for example, multi-component glass or a resin. The sheath 72 is made of, for example, resin. The air layer 68 is configured by hollow fibers 74 that are made of a material having a refractive index that is equal or close to that of the clad 66 and are arranged densely in the circumferential direction and each of the hollow fibers (quartz glass) 74 is integrated or merged with the clad (quartz glass) 66. The hollow fiber 74 may have a structure according to which both end faces thereof are closed and the air therein is isolated from the ambient atmosphere. Though the gas in the hollow fiber 74 is usually air, another gas, for example, $N_2$ gas may be filled with therein.

Figure 3:
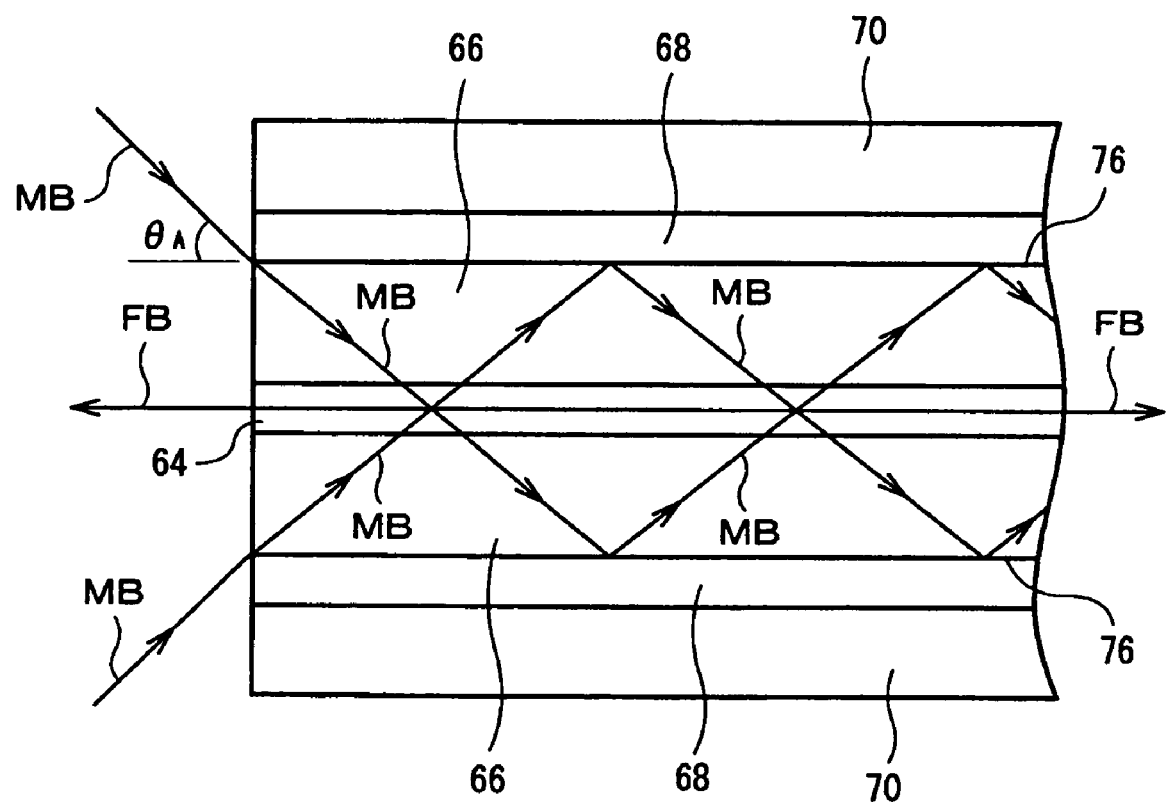
FIG. 3 depicts the mechanism of the propagation of a beam in the optical fiber for oscillation in the embodiment.

FIG. 3 depicts the mechanism of the propagation of a beam in the oscillating fiber 22. The excitation laser beam MB from the LD 30 (FIG. 1) is condensed by the optical lens 32 (FIG. 1); is injected into the end face of the oscillating fiber 22; propagates in the clad 66 in the axial direction repeating total reflection on the interface 76 between the clad 66 and the air layer 68. In this case, assuming that the refractive index of the clad 66 is $n_1$, the refractive index of the air layer 68 is $n_2$, the maximum value of the incident angle with which the oscillating fiber 22 can receive the excitation laser beam MB is $\theta_A$, and the numerical aperture is NA, NA is, for example, NA=0.55.

Figure 5:
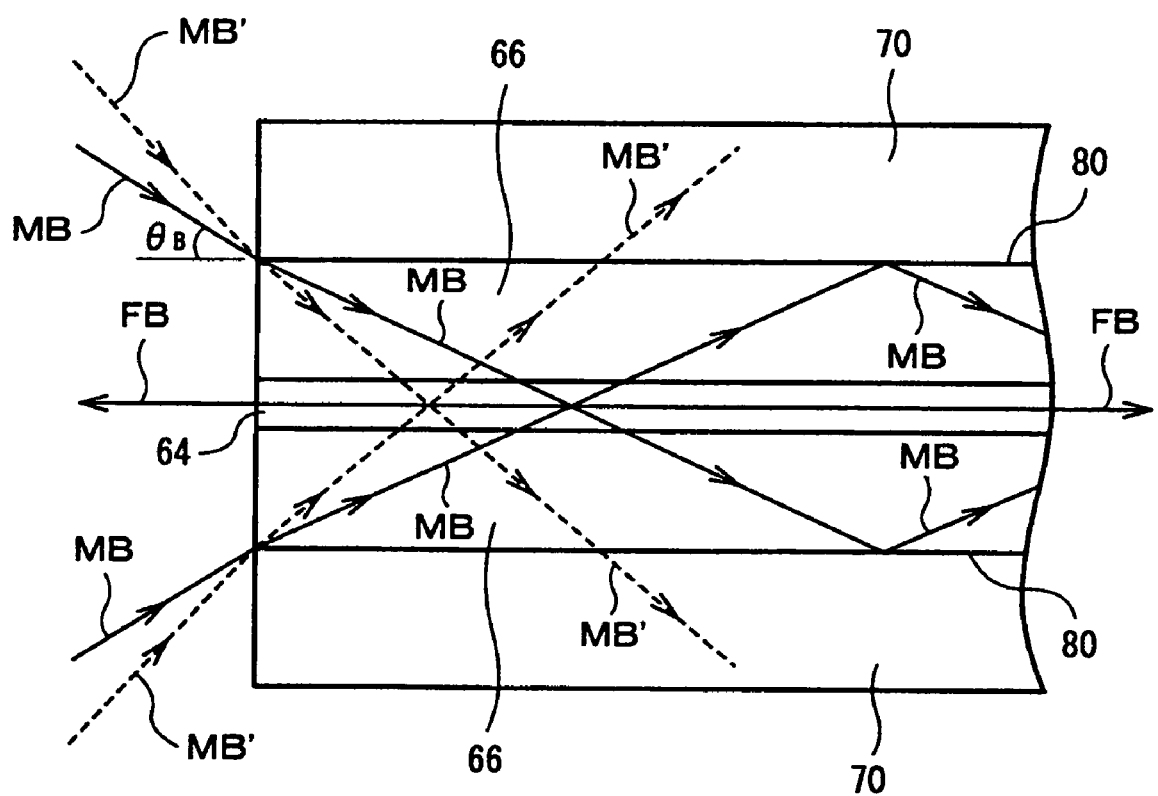
FIG. 5 depicts the mechanism of the propagation of a beam in a structure of an optical fiber for oscillation in a comparative example.

FIG. 5 depicts the mechanism of the propagation of a beam in an oscillating fiber 22' for the case where the fiber 22' is configured by omitting the air layer 68 and providing the supporting unit 70 around the clad 66, as a comparative example. This fiber structure corresponds to the DCF described in the section for the background art. In this case, the excitation laser beam MB having entered the clad 66 from the end face of the oscillating fiber 22' propagates in the axial direction repeating the total reflection on the interface 80 between the supporting unit (outer clad) 70 and the clad 66. In this case, assuming that the refractive index of the supporting unit 70 is $n_3$, the maximum value of the incident angle with which the oscillating fiber 22' can receive the excitation laser beam MB is $\theta_B$, and the numerical aperture is NA, NA is, for example, NA=0.45. An excitation laser beam MB' having entered the clad 66 with an incident angle that exceeds the maximal incident angle $\theta_B$ exits out of the clad 66 without executing any total reflection on a clad interface 80 as represented by a dotted line in FIG. 5 and does not excite the core 64.

As above, in the embodiment, due to the fiber structure of providing the air layer 68 having the minimal refractive index of one around the clad 66 of the oscillating fiber 22, a significant (about 20%) increase of the numerical aperture NA can be realized for the excitation laser beam MB and, thereby, the optical coupling efficiency in the LD end-face excitation scheme can be drastically improved and, thereby, an increase of the output of the fiber laser beam FB can be easily and simply realized and excellent desired laser welding processing can be executed.

Figure 4:
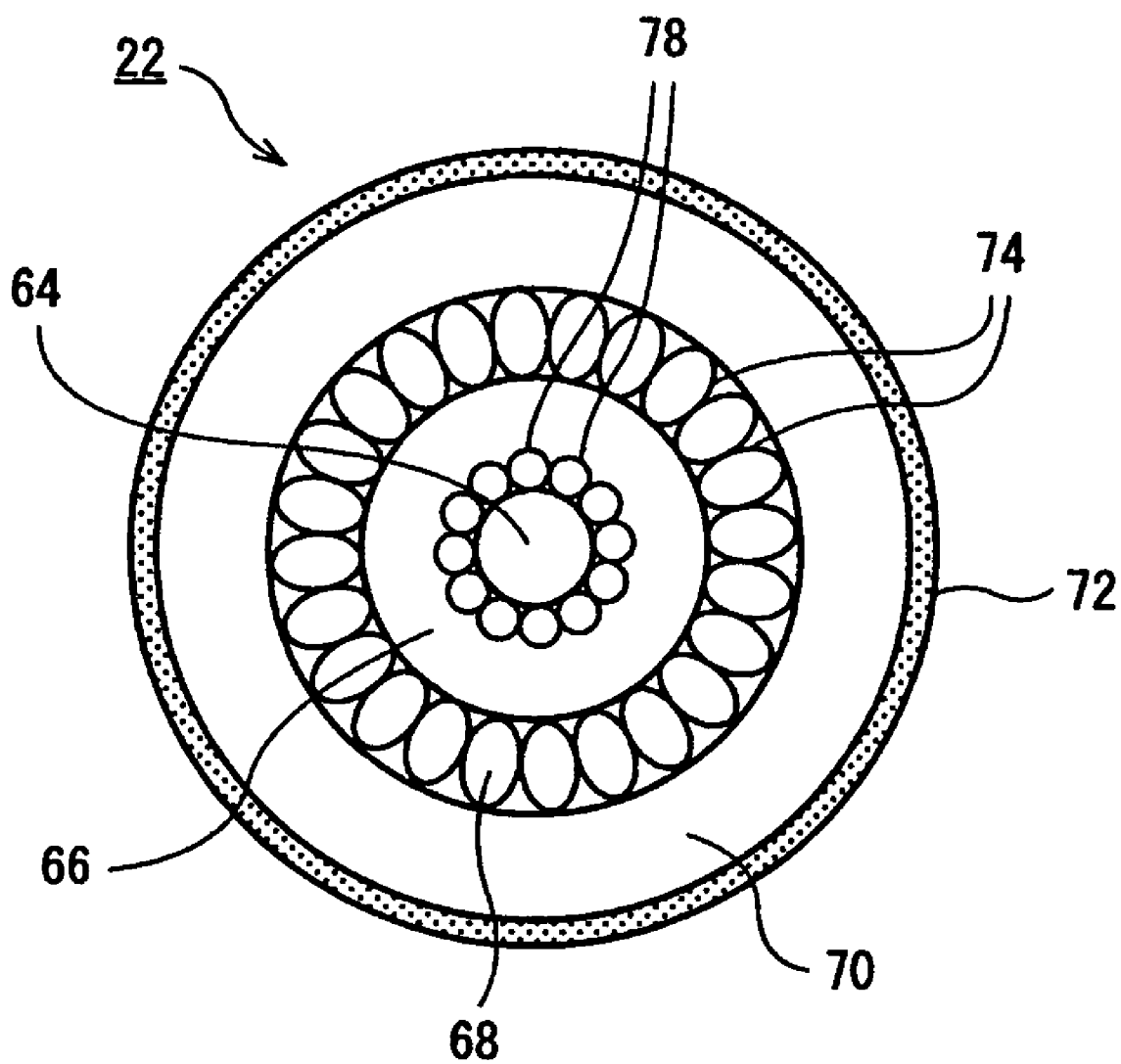
FIG. 4 depicts a simplified schematic cross-sectional view of the structure of an optical fiber for oscillation according to a modified example of the embodiment.

FIG. 4 depicts a modified example of the oscillating fiber 22 in the embodiment. As depicted, a second (inner) air layer is added that is configured by multiple holes 78 arranged in the circumferential direction on the inner circumference or the inner wall portion of the clad 66 surrounding the core 64.

This fiber structure can improve a wave-guiding characteristic that confines in the core 64 the oscillation ray or the fiber laser beam FM that propagates the core 64 and, thereby, the beam quality of the fiber laser beam FM can be improved more.

In the present invention, a configuration may be employed according to which a first (outer) air layer 68 is provided in the clad 66 or the supporting unit 70 in the form of holes.

Though the description has been given for the preferred embodiment of the present invention, the above embodiment does not limit the present invention. Those skilled in the art can make various modifications and changes to the present invention in specific modes of operation thereof without departing from the technical sprit and the technical scope thereof.

For example, in the above embodiment, the fiber laser oscillator 10 and the laser beam irradiating unit 18 are optically connected through the fiber transmission system 16 (the transmitting fiber 52) and the fiber laser oscillator 10 is protected against the disturbances at the processing site. However, a scheme or a configuration may be employed according to which the fiber laser beam FB oscillated and outputted by the fiber laser oscillator 10 is sent to the laser beam irradiating unit 18 directly or through a bent mirror, etc., without using the fiber transmission system 16.

In the fiber laser oscillator 10, modification or partial omission is possible for the electric optical pumping unit 24, the optical resonators 26 and 28, the optical lenses 32 and 34, etc., and other components that exert the same functions and actions may be employed. For example, though the above embodiment employs a one-side excitation scheme according to which the excitation laser beam EM is applied to an end face on one side of the oscillating fiber 22, a both-side excitation scheme may be employed according to which the excitation laser beam is applied to the end faces on both sides of the oscillating fiber 22. Otherwise, a fiber laser beam of a Q switch pulse can be generated by providing a Q switch in the fiber laser oscillator 10.

The fiber laser beam processing apparatus of the present invention is not limited to laser welding and is applicable to laser beam processing such as laser marking, drilling, and cutting.

What is claimed is:

1. A fiber laser beam processing apparatus comprising:
   an optical fiber for oscillation including:
      a core made of quartz glass doped with ions of a rare-earth element as a luminous element;
      a clad made of quartz glass surrounding the core;
      a gas layer configured by hollow fibers made of quartz glass surrounding the clad; and
      a support that surrounds and supports the gas layer;
   an excitation light source that generates an excitation beam to excite the core of the optical fiber for oscillation to generate a fiber laser beam;
   an optical lens that condenses the excitation beam from the excitation light source and injects the excitation beam onto an end face of the optical fiber for oscillation; and
   a laser beam irradiating unit that condenses and applies the fiber laser beam generated by the optical fiber for oscillation onto a processing point on a work to be processed.

2. The fiber laser beam processing apparatus of claim 1, further comprising
   an optical resonator to resonate and amplify an oscillation ray having a predetermined wavelength generated by the core.

3. The fiber laser beam processing apparatus of claim 2, wherein
   the optical resonator comprises a reflecting mirror that faces the end face of the optical fiber for oscillation through the optical lens.

4. The fiber laser beam processing apparatus of claim 3, wherein
   the optical lens collimates the oscillation ray emitted from the end face of the optical fiber for oscillation into a parallel beam and condenses the oscillation ray reflected and returned by the reflecting mirror onto the end face of the optical fiber for oscillation.

5. The fiber laser beam processing apparatus of claim 1, wherein
   the excitation light source comprises a laser diode.

6. A fiber laser beam processing apparatus for welding a work, the fiber laser beam processing apparatus comprising:
   an optical fiber for oscillation including:
      a core made of quartz glass doped with ions of a rare-earth element as a luminous element;
      a clad made of quartz glass surrounding the core;
      a gas layer configured by hollow fibers made of quartz glass surrounding the clad; and
      a support that surrounds and supports the gas layer;
   an excitation light source that generates an excitation beam to excite the core of the optical fiber for oscillation to generate a fiber laser beam for weld processing;
   an optical lens that condenses the excitation beam from the excitation light source and injects the excitation beam onto an end face of the optical fiber for oscillation;
   an optical fiber for transmission to transmit the fiber laser beam to a remote laser processing site;
   a laser beam injecting unit that injects the fiber laser beam outputted from the optical fiber for oscillation onto a first end face of the optical fiber for transmission;
   a laser beam irradiating unit that condenses and applies the fiber laser beam exited from a second end face of the optical fiber for transmission, after propagating the optical fiber for transmission, onto a processing point on the work to be welded;
   a setting unit that sets a desired reference waveform for the laser power of the fiber laser beam;
   a laser power measuring unit that measures the laser power of the fiber laser beam oscillated and outputted by the optical fiber for oscillation; and
   a power source unit that drives the excitation light source such that a laser power measured value obtained from the laser power measuring unit coincides with the reference waveform.

* * * * *